INVENTORS
WILLIAM W. CAMPBELL
EARL LEATHAM
BY ALBERT H. PACK

ATTORNEY

United States Patent Office 3,298,840
Patented Jan. 17, 1967

---

3,298,840
MATERIAL HANDLING
William W. Campbell, Ludington, Mich., Earl Leatham, Wexford, Pa., and Albert H. Pack, Ludington, Mich., assignors to Harbison-Walker Refractories Company, Pittsburgh, Pa., a corporation of Pennsylvania
Filed Aug. 21, 1962, Ser. No. 218,396
5 Claims. (Cl. 106—58)

This invention relates to material handling, and more particularly to an improved method of briquetting refractory oxide material for subsequent dead burning treatment. In another aspect, it relates to a novel briquette shape.

It is conventional in the refractories industry to prepare small briquette-like shapes from finely divided refractory oxide material preparatory to dead burning and densification processes. In the past, it has been conventional to prepare generally almond shaped briquettes from such finely divided refractory oxides and to thereafter pass these briquettes through a shaft kiln operating at high temperatures in order to obtain a densified dead burned high purity product. The processes disclosed in the copending U.S. applications S.N. 847,864 of Snyder et al. for "Production of Dead Burned Magnesia" now United States Patent No. 3,060,000, and S.N. 40,181 of Leatham et al. for "Production of Dead Burned Grain," now United States Patent No. 3,060,042 (both owned by the same assignee as the present application) are indicative of processes in which such briquette-like shapes are formed from a refractory oxide material for a subsequent dead burning step. Collectively, these two applications are concerned with dead burning briquetted materials of the group dolomite, magnesite, lime and mixtures thereof.

It is among the objects of this invention to provide an improved method of forming briquette-like shapes of materials of the type, for example, disclosed in the copending applications mentioned above. It is another object of this invention to provide a novel shape for refractory briquettes, which shape is instrumental in increasing the capacity of a shaft kiln in which the briquettes are subsequently dead burned; which novel shape is instrumental in providing improved heat transfer across such shaft kilns; which novel shape is instrumental in facilitating material handling through the kiln including substantial reduction in accumulation of undesirable fines in the kiln; and which novel shape is instrumental in obtaining better combustion across the kiln.

Briefly, according to one aspect of the invention, there is provided a method of producing a novel, generally V-shaped, briquette from selected refractory oxides which briquettes facilitate subsequent dead burning treatment.

A better understanding, other features and further objects and advantages of this invention will be readily apparent to those skilled in the art from a study of the following detailed description with reference to the drawings. In these drawings.

Figure 1:
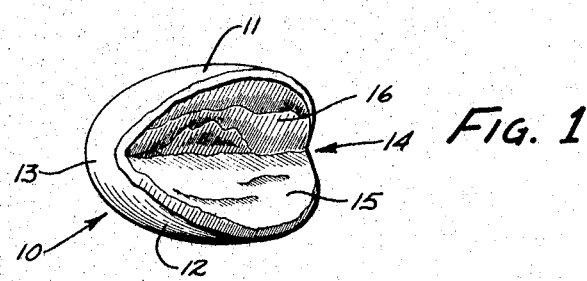
FIG. 1 is a perspective view of the novel shape for briquettes fabricated according to the method of this invention.

The briquette like shapes fabricated according to the concepts of this invention may be characterized as generally V-shaped. Such a shape, as shall be developed in more detail below, makes it feasible to include a greater mass of material in each briquette, as compared to previous almond shaped briquettes. This generally V-shaped briquette has been found to increase the capacity of a given shaft kiln by as much as 25%. This increased capacity is primarily due to a reduction in the pressure drop through the kiln for a constant volume of air and is the direct result of an increase of from 5 to 10% of the open space through the kiln as a charge of V-shaped briquettes pass therethrough. This additional open space allows a considerable reduction in air velocity through the kiln for a given volume of air as compared to velocities previously obtainable with almond shaped briquettes. Furthermore, because of the additional space, capacity for a given kiln can be increased, if so desired, because the velocity of the hot air emanating from the burning zone of the kiln does not become high enough to hang the load up in the kiln as has sometimes previously occurred with almond shaped briquettes. The generally V shape for the briquettes also provides considerable improved heat transfer between the incoming, upwardly moving air and the downwardly moving briquette charge. This is apparently the direct result of about 25% increase in surface area per unit of weight for the briquettes. Further, this increased surface area per unit of weight results in faster heat transfer thus improving the heat balance about the kiln.

Also, because of the increased weight of the V-shaped briquettes they move downwardly through the kiln much easier than the smaller previously used almond shape briquettes. This increased weight is apparently one of the primary reasons that greater air capacity, with commensurate increase in air velocity, may be had in the kiln without hanging up the load. Normally the air velocity from the burning zone in a shaft kiln will be on the order of 200 ft. per second.

In operating a shaft kiln it is desirable to remove all of the fines since the kiln operating temperature is very close to the melting temperature of the material being treated, and the fines tend to become sticky and to fuse the briquettes together, blocking the kiln in extreme conditions, or causing large non-uniform agglomerates to form.

Previously, to remove the fines it has been necessary to carefully screen the briquettes being charged to the kiln. However, even under the best conditions, some fines tend to be introduced into the kiln with the charge, or they are formed during the charging because of the relatively brittle nature of the briquettes. With the novel V-shaped briquettes according to this invention it has been found that these fines accumulate in the V-shaped notch formed in the center of the briquettes. And even if they melt therein, they do not cause fusing between briquettes and little difficulty is experienced in obtaining a substantially uniformly dead burned and densified product.

As noted above, with the novel V-shaped briquettes of this invention, a 5 to 10% increase in open space through the kiln is obtained which considerably facilitates control of the air through-put of the kiln. Additionally, and commensurate with this increase in space and better air through-put, improved fuel combustion is obtained because this space represents an increase in the porosity of the load passing through the kiln which promotes rapid combustion of the fuel substantially uniformly across the kiln.

In FIG. 1 a novel V-shaped briquette 10 according to the concepts of this invention is shown. The briquette is characterized by a pair of generally convex elliptical sides 11 and 12 joined at apex 13 to form the outwardly opening generally V shape in which a groove or mouth 14 is defined by the generally concave inner faces 15 and 16 of the sides 11 and 12.

Figure 2:
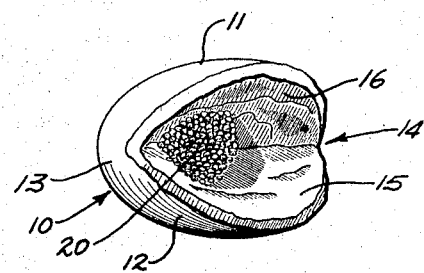
FIG. 2 is a perspective view of an exemplary briquette of the type shown in FIG. 1 after dead burning in a shaft kiln.

FIG. 2 is indicative of the manner in which fine particles 20 in a charge passing through a kiln tend to accumulate in the mouth 14. These fine particles 20 accumulated in mouth 14 tend to be maintained therein by fusing to the faces 15 and 16 of the sides 11 and 12.

Figure 3A:
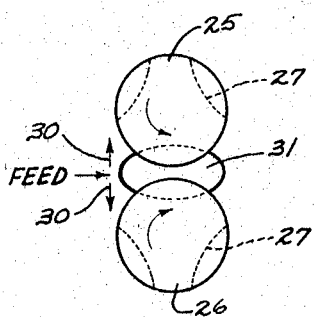
FIGS. 3A, B, and C are schematic views of sequential steps in the manufacture of briquettes according to this invention.
Figure 3B:
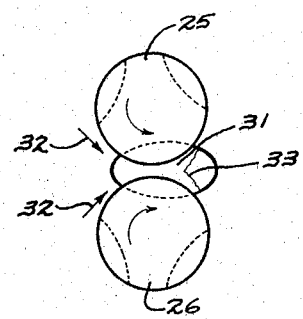
Figure 3C:
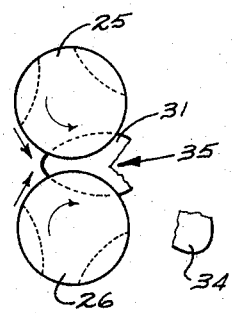

A preferred method of manufacturing the novel V-shaped briquettes of this invention can be best understood with reference to the steps represented by FIGS. 3A, 3B, and 3C. In operation a pair of briquetting rolls 25 and 26 rotate in the direction indicated by the arrows, and are arranged to exert 20,000–40,000 p.s.i. on material passing through their bite. Formed at spaced intervals about their peripheral surfaces are a series of half almond shaped depressions 27 so arranged as to cooperate to form generally almond shape voids at the bite. According to this invention, sufficient material is passed through the bite of the rolls as to overload them and force them apart in the direction generally indicated by arrows 30. This action allows the accumulation of a briquette-like mass 31, of a size greater than that required to fill the almond shaped void normally formed at the bite. As the rolls 25 and 26 continue to rotate and the mass of material 31 moves through the bite, the rolls tend to approach each other as indicated by the arrows 32. As the rolls continue to rotate they pinch the rear of the mass of material 31 causing a generally V-shaped fracture 33 to form along leading edge thereof. Just before the mass 31 leaves the bite of the rolls (as shown in FIG. 3C) a small piece of material 34 falls from mass 31 to form the V-shaped mouth or groove 35.

In actual operation, the pieces of material which fracture from the briquettes, such as piece 34 in FIG. 3C, are recycled and added to the feed to the briquette rolls.

Having thus described the invention in detail there with sufficient particularity as to enable those skilled in the art to practice it what is desired to have protected by Letters patent is set forth in the following claims:

We claim:
1. As a charge for a shaft kiln, a plurality of generally V-shaped briquettes fabricated of refractory material selected from the group consisting of dolomite, magnesite, lime and mixtures thereof.

2. As a charge for a shaft kiln, a plurality of generally V-shaped briquettes fabricated of refractory material selected from the group consisting of dolomite, magnesite, lime and mixtures thereof, said briquettes characterized by a pair of generally convex elliptical sides joined at an apex to form an outwardly opening generally V-shaped mouth.

3. As an article of manufacture, a refractory briquette characterized by a pair of generally convex elliptical sides joined at an apex to form an outwardly opening generally V-shaped mouth, the inner faces of said sides characterized by a generally concave surface configuration, said briquette fabricated of refractory material selected from the group consisting of dolomite, magnesite, lime and mixtures thereof.

4. As an article of manufacture, a refractory briquette characterized by a pair of generally convex sides joined at an apex to form an outwardly opening generally V-shaped mouth, the inner faces of said sides characterized by a generally concave surface configuration, said briquette fabricated of refractory material selected from the group consisting of dolomite, magnesite, lime and mixtures thereof.

5. As an article of manufacture, a refractory briquette having an elongate mouth formed along a surface, said briquette fabricated of refractory material selected from the group consisting of dolomite, magnesite, lime and mixtures thereof.

References Cited by the Examiner
UNITED STATES PATENTS 3,074,806  1/1963  Atlas et al. _____ 106—58

HELEN M. McCARTHY, *Acting Primary Examiner.*

TOBIAS E. LEVOW, *Examiner.*

J. POER, *Assistant Examiner.*